UNITED STATES PATENT OFFICE.

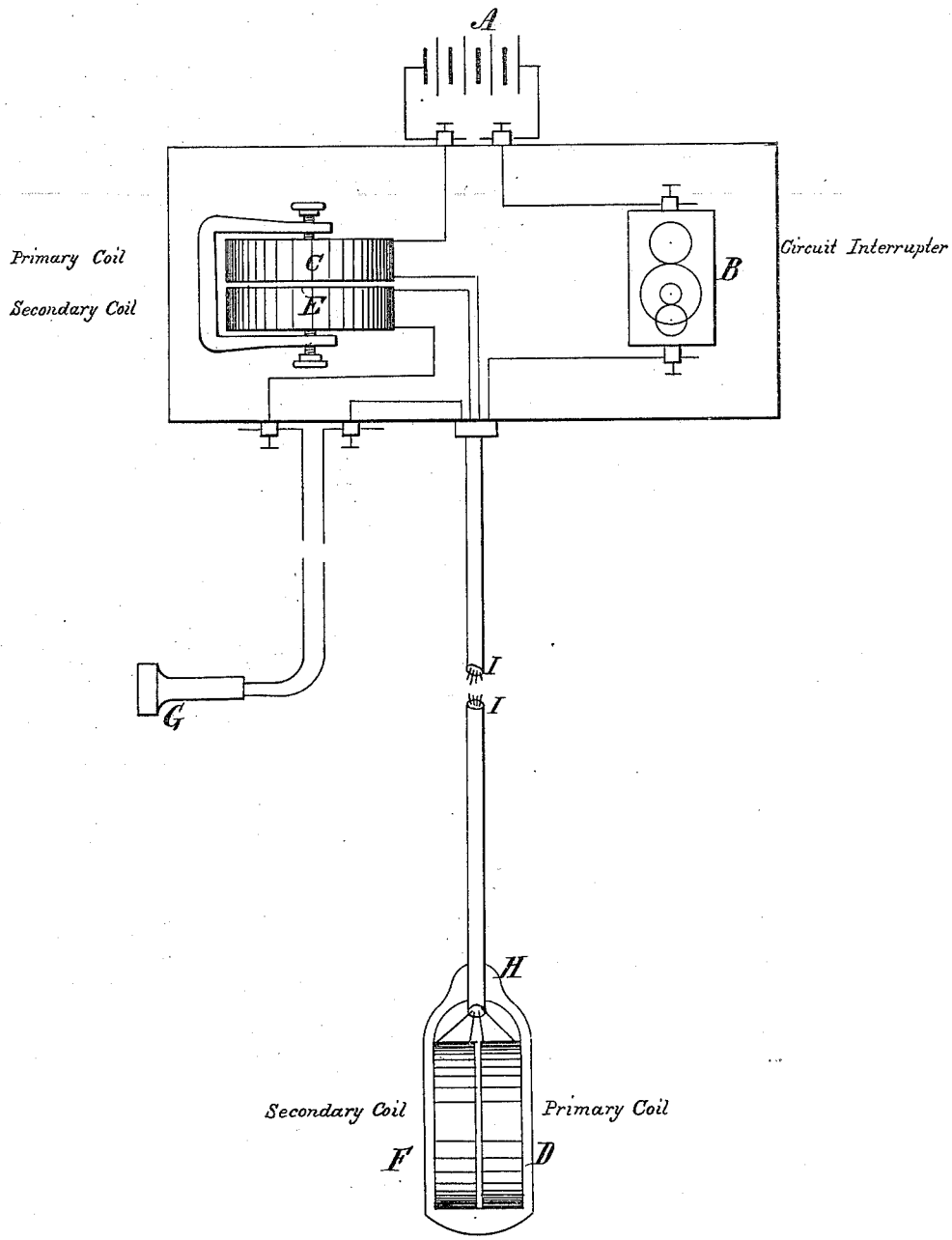

CHARLES AMBROSE McEVOY, OF 18 ADAM STREET, ADELPHI, COUNTY OF MIDDLESEX, ENGLAND.

APPARATUS FOR FINDING TORPEDOES, &c.

SPECIFICATION forming part of Letters Patent No. 269,439, dated December 19, 1882.

Application filed July 12, 1882. (No model.) Patented in England December 16, 1881, No. 5,518.

*To all whom it may concern:*

Be it known that I, CHARLES AMBROSE McEVOY, a subject of the Queen of Great Britain, residing at 18 Adam Street, Adelphi, in the county of Middlesex, England, have invented certain new and useful Improvements in Apparatus for Finding Torpedoes, &c., (for which I have received Letters Patent in Great Britain, No. 5,518, dated 16th December, 1881,) of which the following is a specification.

This invention has for its object improvements in apparatus to be used in torpedo operations, and in searching for submerged bodies, and for like purposes.

The apparatus which I employ in searching for torpedoes is carried by a boat, partly within the boat and partly suspended in the water. Within the boat there is a galvanic battery and an automatic contact-breaker, which opens and closes the battery-circuit at short intervals; or suitable pulsating currents may be obtained from a small magneto-electric or dynamo-electric machine. The battery-circuit or primary circuit includes two primary coils, one within the boat, the other outside and immersed some depth in the water, being suspended from the boat by a cable of suitable length, in which conducting-wires are inclosed. Each primary coil has its secondary coil, and the two secondary coils are connected by wires in the suspending-cable. Within the boat a telephone is included in the secondary circuit. The apparatus is adjusted so that under ordinary circumstances little or no sound is heard in the telephone, notwithstanding the pulsations of the primary current, because the induction in one secondary coil is by adjustment made to neutralize the induction in the other secondary coil; but when a metallic torpedo or other mass of metal is approached the adjustment is deranged and sounds become audible in the telephone. I make use of a like arrangement to indicate the approach of iron ships to anchored torpedoes. In this case the induction produced near the torpedo is neutralized by another induction on shore, the torpedo and the shore station being connected by a cable. The approach of a mass of metal—such as an iron-clad—to the torpedo disturbs the balance and sounds become audible in the telephone.

The torpedo may then be fired electrically by means of the cable-connection.

In carrying out my invention I arrange within a box the following parts, viz: the battery, the circuit-breaker, and one set of coils. For the battery four small cells, of Leclanché or other convenient pattern, will be found suitable. The circuit-breaker consists of a clock-train giving movement to a toothed wheel, of which every tooth as the wheel revolves comes in succession into contact with a light spring and closes the battery-circuit. These contacts should occur in rapid succession—that is to say, there should be several makes and breaks in each second of time; but it is convenient that the clock-train should be capable of regulation within wide limits in respect to the speed at which it runs. The set of coils within the box consists of one primary and one secondary coil. These coils are made and arranged on a well-known principle, and so that pulsations of the current in the primary coil may most efficiently produce a corresponding flux and reflux in the secondary coil. I also arrange for the control or adjustment of the inductive action in these coils, and by preference I make one of the coils movable by means of a screw, so that it may be approximated more or less closely to the other coil. From the pair of coils the wires lead to binding-screws upon the end of the box. Binding-screws are also provided for the attachment of a telephone of the well-known Bell type. These binding-screws also, when the apparatus is in use, receive the ends of four insulated wires contained within a sounding-line, which carries a hollow weight at its lower end. This weight should be of some non-metallic material. I prefer to employ stone or stoneware, and within the weight there is contained in a water-tight case another pair of induction-coils, arranged to be as sensitive as possible to the influence (on the induction taking place between the coils) of masses of metal to which in the use of the apparatus the coils on the sounding-line may happen to be approached. The connections are such that the two primary coils, the battery, and the contact-breaker are in one circuit and the two secondary coils and the telephone in the other circuit.

In the use of the apparatus, the parts having been coupled and the sounding-line being over the side of the boat carrying its coils suspended in the water, the clock-train is started and sounds are listened for in the telephone. If any be heard, the instrument is adjusted by means of the adjusting-screw, already referred to, until the sounds cease, or nearly so. The boat is then moved over the water to be searched, and on the approach to any mass of metal sounds will again be heard.

The annexed drawing represents the appatus arranged for torpedo searching. The upper part of the figure shows the instrument with the boat. The lower part of the figure (below the break or interruption which is made in the cable for the purpose of shortening the figure) shows the parts which hang suspended in the water.

A is the galvanic battery. B is the clock-work circuit-interrupter; but for the parts A and B a small magneto-electric or dynamo-electric machine may be substituted; or, when the battery A is retained, a simple trembling circuit-interrupter—such as there is in an electric bell—may be substituted for the clock-work. C is the upper primary coil. D is the lower primary coil. E is the upper secondary coil. F is the lower secondary coil. The distance between the coils C and E is adjustable. G is a receiving-telephone in circuit with the coils E and F. H is an ebonite, stoneware, or other box, made in two parts bolted together. It contains the two coils, D and F, and the interstices are filled with paraffine to exclude water. I is the cable containing insulated conductors.

A similar arrangement is applicable to indicate the approach of iron vessels to a position in which induction-coils are arranged, and from whence a cable leads to the shore or other place, where is the box of apparatus already described; or, as before stated, in place of obtaining intermittent currents by means of a battery and a mechanical automatic circuit-breaker, alternating currents suitable for my purpose may be derived from a small magneto-electric or dynamo-electric machine.

What I claim is—

My apparatus, consisting of primary and secondary coils, C and E, a telephone, G, and mechanism A B, yielding pulsating electric currents, and a cable, I, containing insulated conductors passing from these into water to other primary and secondary coils, D and F, at its farther end, substantially as described.

CHARLES AMBROSE McEVOY.

Witnesses:
  JOHN DEAN,
  T. J. OSMANS,
    *Both of 17 Gracechurch Street, London.*